United States Patent Office 3,816,551
Patented June 11, 1974

3,816,551
SEPARATION BY CRYSTALLIZATION IN
PRESENCE OF WATER
Roberto Lee, St. Louis, Mo., assignor to
Monsanto Company, St. Louis, Mo.
No Drawing. Continuation-in-part of abandoned application Ser. No. 90,476, Nov. 17, 1970. This application Sept. 5, 1972, Ser. No. 285,993
Int. Cl. C07c 79/12
U.S. Cl. 260—646                                    5 Claims

ABSTRACT OF THE DISCLOSURE

An improved process for separating an isomer from a mixture of isomers by crystallization, the improvement being the presence of water in the crystallizer to enhance crystallization. Isomers of halobenzene, nitrobenzene, nitrohalobenzene and mixtures thereof can be separated.

---

This application is a continuation-in-part of application, Ser. No. 90,476, filed Nov. 17, 1970, now abandoned. The present invention relates to separation by crystallization. More specifically, it relates to an improved process for separating the components of mixtures of compounds, or mixtures of chemical isomers, by crystallization in the presence of water.

The separation of chemical compounds and chemical isomers by means of crystallization finds many applications in industry. While many separations can be made by distillation or solvent extraction, there are cases where these methods are impractical or impossible, and the desired separation can be achieved more advantageously by means of crystallization. Thus, in the case of chemical isomers having similar boiling points and other similar physical and chemical properties, or materials having relatively high boiling ranges, or thermally unstable substances, separation by crystallization may be the only method which can be advantageously employed.

Thus, the components of mixtures of position isomers and chemical homologs are commonly separated from each other by crystallization. Crystallization can be carried out either in the presence of a solvent (called crystallization from solution) or in the absence of a solvent (called crystallization from melt). Crystallization from solution accomplishes the separation of components in a mixture by using the differences in solubility at specific temperatures. Crystallization from melt, on the other hand, makes use of the differences in crystallizing points. In the latter case, the melt liquor which is at a temperature where all of the components are soluble in the melt, is gradually lowered until a temperature is reached where crystals with the highest crystallizing point are formed. Thereafter, the solid crystals with the highest crystallizing point are separated from the metal liquor.

There are two types of fractional crystallization, namely, suspension crystallization and surface crystallization. In suspension crystallization, the crystals formed are suspended in the mother liquor and subsequently filtered from the mother liquor in order to accomplish separation. In surface crystallization, the crystals form or nucleate on a cooled surface and the mother liquor is drained away to accomplish separation. On a commercial scale, surface crystallization is utilized for various separations such as the separation of position isomers, homologs and waxes from oil.

The process of crystallization is further characterized by whether it is a static process or a dynamic process. The improved process of the present invention is advantageously employed in a dynamic crystallization system. Thus, the advancement taught by the present invention can be employed, for example, in batch dynamic crystallization or in a continuous crystallization process.

An exemplary application of the process of the present invention is in the resolution of a particular isomer of an aromatic hydrocarbon from a mixture of isomers. Illustrative is the use of the process of this invention for resolving substantially pure p-nitrochlorobenzene from a mixture of nitrochlorobenzene isomers.

p-Nitrochlorobenzene is used in the manufacture of p-aminophenol, 2-chloro-5-nitrobenzene sulfonic acid, 2,6-dichloro-4-nitroaniline, 5 - amino-2-aniline benzene sulfonic acid, pharmaceutical acetophenetidine and a variety of antioxidants and gum inhibitors.

There exists a need for upgrading nitrochlorobenzene isomer resolution technology in order to minimize manufacturing costs and to obtain higher purity in the p-nitrochlorobenzene isomer. This is but one example of an application of the improved crystallization process of the present invention.

Prior to the surprising discovery embodied in the present invention, crystallization processes of the type hereinbefore described were conducted under essentially anhydrous conditions. The reason for avoiding even small amounts of water in the crystallizer was to prevent corrosion of the equipment.

Quite unexpectedly, the improved process of the present invention achieves its results by the intentional introduction of water to the crystallizer. Corrosive tendencies can be minimized herein by incorporating small amounts of a caustic solution in the crystallizer during the process.

It is an object of the present invention, therefore, to provide an improved process for separation of isomers by crystallization. Another object of the present invention is to provide an improved process for the separation of isomers by crystallization wherein the crystallization is carried out in the presence of water. Another object of the present invention is to provide a crystallization process wherein greater product recovery per batch is obtained compared to the results when water is not used. Yet another object of the present invention is to provide a crystallization process which affords the production of high purity isomers at reduced manufacturing costs.

These and other objects of the present invention are achieved in a process for resolving an isomer of a substantially water-insoluble compound, in admixture with one or more isomers of the compound, the isomer having a melting point above 0° C. at one atmosphere and being separable from the admixture by crystallization from melt, which comprises the steps of cooling the admixture to a temperature at which the isomer crystallizes and recovering crystals of the isomer, wherein the improvement comprises adding water to the admixture before the crystals are recovered. In one embodiment of the present invention, an isomer of a halogen substituted or nitro substituted halobenzene or nitrobenzene is resolved by the improvement which comprises adding water to the admixture in a weight ratio of from about 1:1 to 5:1, based on the weight of the admixture, before the crystals are recovered.

In a preferred embodiment of the present invention, employing continuous crystallization in the presence of water, the para isomer of nitrochlorobenzene is resolved in high purity, e.g., 99.5 percent, from a mixture of the ortho, meta and para isomers of nitrochlorobenzene. In a typical case, the para isomer is present in the crude mixture in a purity of approximately 90 percent. By introducing water to mobilize a thick slurry of the mixture produced within a conventional crystallizer, e.g. a constant overflow, stirred tank, followed by contrifugation to separate the mother liquor from the crystals, p-nitrochlorobenzene can be obtained with a purity of 99.5 percent. In one embodiment, 1 part by weight of the crude nitrochlorobenzene mixture is charged to the stirred crystallizer tank with 2 parts by weight of water at about 75° C. Thereupon, the batch is cooled down to about 30° C. by reducing system pressure. Cooling for crystallization is achieved by vaporizing and refluxing the condensed water.

The prior art discloses the use of solvents such as chlorobenzene in the crystallizer tank for the isomeric resolution of $p$-nitrochlorobenzene. In such systems, the crystallization temperature of the solution is appreciably lowered, thus requiring expensive refrigeration equipment for the cooling effect necessary to achieve crystallization. An important advantage of using water, therefore, is that water is immiscible with $p$-nitrochlorobenzene and the crystallization temperature of the latter is not appreciably altered. The aforementioned refrigeration equipment is thus obviated.

In the discovery taught by the present invention there was observed a threefold advantage in the use of water as a diluent in the resolution and purification of $p$-nitrochlorobenzene. These advantages are as follows: a thick slurry is mobilized, producing greater product recovery per batch; cooling is conveniently accomplished without causing caking; and larger and denser crystals are obtained. Such advantages are entirely unexpected, particularly in view of the fact that prior art crystallization processes of this type specifically avoid the presence of water.

The following example illustrates continuous, dynamic crystallization of $p$-nitrochlorobenzene wherein the improvements of the present invention are employed.

Example 1

Approximately 139 pounds per hour of a nitrochlorobenzene mixture (88.2% para, 10.8% ortho, 0.9% meta and trace amounts of chlorobenzenes) and 27 gallons per hour of tap water were fed continuously to a 50 gallon crystalizer. About 1,000 cc. per hour of 0.5 N NaOH were also charged to minimize corrosion of equipment. The crystallizer was a commercial unit having a jacketed pot with top openings for feeding and vent and a bottom outlet for discharging. The outlet consisted of a plug valve with a rod-out mechanism. The line leading from the outlet to a 20"-I.D. conventional centrifuge was a 1½"-I.D. flexible stainless steel tubing which was traced with copper tubing for heating by steam.

Water and sodium hydroxide solution were pumped into the crystallizer. Rotameters and valves were used for metering. Molten nitrochlorobenzene was kept in an overhead tank, and was fed into the crystallizer by gravity flow. The nitrochlorobenzene feed line extended well into the crystallizer to a level just above the stirrer in order to achieve maximum dispersion in the water-organic slurry.

The temperature of the crystallizer was maintained at 60° C. by passing tempered water through the crystallizer jacket. The average residence time of the slurry in the crystallizer was about one hour.

The discharged slurry was collected in the vertical, screen-bowl centrifuge which was wrapped with heat transfer tubing and was kept at the crystallizer temperature by passing tempered water through it. For washing crystals in the centrifuge basket, tempered tap water was sprayed onto the cake through four nozzles. An approximate centrifuge cycle was as follows: 1 min. for charging; 1 min. for wringing at 1000–1400 r.p.m. (280–550 G); 1–1½ min. for washing crystals, and 2–3 min. for final wringing before the centrifuge was stopped for digging. The water wash to cake weight ratio ranged from 1.4:1 to 0.6:1.

Analysis of the cake showed a purity of 99.5% $p$-nitrochlorobenzene with a crystallizing temperature, on a dry basis, of 83.0° C. The moisture content of the crystals ranged from 3.3 to 4.6 weight percent. The mean particle size was about 40 mesh.

The outstanding improvements afforded by the process of the present invention become more apparent by a comparison of product recovery achieved with and without the presence of water during crystallization. More specifically, it has been found that the recovery of the desired isomer, e.g., $p$-nitrochlorobenzene in the case of Example 1 above, can be in the range of 65% to 75% of theory when the crystallization is conducted in the presence of water. When similar process steps are employed except with the absence of water or any other diluent, isomer recovery of 30% to 35% of theory is commonly achieved. The economical advantages of the process of the present invention are thus highly significant.

The superiority of water as a diluent in the process of the present invention is further illustrated by comparison with results obtained by the use of ethylene glycol for the same function. In the isomeric resolution of $p$-nitrochlorobenzene, the introduction of ethylene glycol to the admixture in the crystallizer produced greater recovery per pass of the desired isomer as compared to the use of no diluent at all. The resulting crystals of $p$-nitrochlorobenzene, however, were small, round grains instead of the large, dense crystals obtained when the diluent was water.

There are two other disadvantages associated with the use of ethylene glycol. First, it is considerably more expensive than water. Secondly, it has greater solubility in the organic admixture, thus requiring subsequent separation and recovery of the desired organic compound. Thus, water, because of its very low solubility in the admixture, has been found to be outstanding in the process of the present invention.

While Example 1 above pertains to the crystallization of $p$-nitrochlorobenzene, it is to be understood that the process of the present invention is applicable to the crystallization of many other compounds and isomers. It is necessary, of course, that the compound being crystallized have low or zero solubility in water and that its melting point be above the freezing point of water, viz., above 0° C. at atmospheric pressure.

Other exemplary isomers which can be separated from an isomeric mixture by the process of this invention are $o$-nitrobromobenzene, $m$-nitrobromobenzene, $o$-nitrochlorobenzene, $m$-nitrochlorobenzene and $p$-dichlorobenzene.

Considerable variation is afforded in the amount of water which is employed with the admixture containing the isomer or compound to be resolved. It has been found advantageous to introduce water in a weight ratio of from about 1:1 to about 5:1, based upon the weight of the admixture. It is to be understood, however, that the range stated above is merely a preferred range and that the process of the present invention is operable below and above the preferred range.

Because the introduction of water according to the instant process can have a corrosive effect on the equipment associated therewith, it is often advantageous to introduce minor amounts of a caustic solution to minimize corrosion. Exemplary caustic compounds for this use are sodium hydroxide, sodium carbonate, ammonium hydroxide and sodium phosphate.

As evidenced by the procedure set forth in Example 1 above, the temperature of the water introduced to the crystallizer is not critical. Thus, tap water at ambient temperature was employed in that instance. It is preferred that the water be cold so that the amount of cooling necessary to achieve crystallization is minimized.

When the improved process of the present invention is employed for crystallization under batch conditions, instead of continuous conditions, it is necessary to provide mechanical agitation of the slurry. High recovery of the desired isomer can thus be obtained in a batch dynamic crystallization system employing water as taught herein.

While this invention has been described by reference to various specific examples and embodiments, it is to be understood that the invention is not limited thereto and that it can be variously practiced within the scope of the following claims.

What is claimed is:

1. In a process for resolving an isomer of a compound selected from the group consisting of halobenzene, nitrobenzene, nitrohalobenzene and mixtures thereof, in admixture with one or more isomers of the compound, the isomer having a melting point above 0° C. at one atmosphere, and being separable from the admixture by crystallization from melt, which comprises the steps of cooling the admixture to a temperature at which the isomer crystallizes and recovering crystals of the isomer, the improvement comprising adding water to the admixture before the crystals are recovered.

2. In a process of claim 1 wherein the improvement comprises adding water to the admixture before the crystals have formed.

3. In a process of claim 1 wherein the water is added to the admixture in a weight ratio of from about 1:1 to 5:1 based on the weight of the admixture.

4. In a process of claim 1 wherein the compound is nitrochlorobenzene.

5. In a process of claim 1 wherein the isomer is *para*-nitrochlorobenzene.

References Cited

UNITED STATES PATENTS

| | | | |
|---|---|---|---|
| 2,769,852 | 11/1956 | Paulson | 62—58 |
| 3,029,278 | 4/1962 | Spiller Jr. et al. | 260—707 X |
| 3,272,875 | 9/1966 | Gordon et al. | 260—646 |
| 3,311,666 | 3/1967 | Dunn | 260—646 |
| 3,541,804 | 11/1970 | Wiegandt et al. | 62—58 |

LELAND A. SEBASTIAN, Primary Examiner

U.S. Cl. X.R.

260—707, 645